United States Patent
Chiang

(10) Patent No.: US 6,330,084 B1
(45) Date of Patent: Dec. 11, 2001

(54) FLATBED SCANNER WITH A SELF-DRIVEN SCANNING MODULE

(75) Inventor: Te-Ming Chiang, Taipei (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 09/033,780

(22) Filed: Mar. 2, 1998

(51) Int. Cl.⁷ .................................................. H04N 1/04
(52) U.S. Cl. ........................................ 358/497; 358/474
(58) Field of Search .................................. 358/497, 494, 358/474, 482, 400, 410, 471; 382/312; 399/211, 32, 36, 202; 250/208.1, 234

(56) References Cited

U.S. PATENT DOCUMENTS

| | | | |
|---|---|---|---|
| 4,525,748 * | 6/1985 | Carbone | 358/472 |
| 5,235,353 * | 8/1993 | Hirano et al. | 346/145 |
| 5,669,048 * | 9/1997 | Nishio et al. | 399/206 |
| 6,072,602 * | 6/2000 | Sun et al. | 358/497 |

* cited by examiner

*Primary Examiner*—Cheukfan Lee
(74) *Attorney, Agent, or Firm*—Winston Hsu

(57) ABSTRACT

The present invention relates to an image scanner with a self-driven scanning module. The scanner comprises a housing having a transparent platform on its top for placing a document, a track mechanism installed inside the housing along a front-and-rear direction of the housing, a scanning module mounted on the track mechanism slidable along the front-and-rear direction for scanning the document, and a driving device installed on the scanning module having a roller wheel and a motor for driving the roller wheel to move the scanning module back and forth along the track mechanism.

16 Claims, 8 Drawing Sheets

FLATBED SCANNER WITH A SELF-DRIVEN SCANNING MODULE

BACKGROUND OF THE INVENTION

1. Field of the Invention

The present invention relates to a flatbed scanner, and more particularly, to a flatbed scanner with a self-driven scanning module.

2. Description of the Prior Art

Image scanners are commonly used for scanning documents into computers. The most commonly used scanners are flatbed scanners. The scanning module of a prior art flatbed scanner is installed under a transparent platform for scanning a document placed on the transparent platform. The scanning module does not have any self-driven device mounted on its body to drive the scanning module directly, and thus requires a driving device installed inside the scanner to pull it back and forth along a track mechanism, maintain its balance and scanning direction, etc. The driving device usually comprises a stepping motor, several wheels rotatably fixed at various positions inside the scanner, and a connecting mechanism such as steel strips or a circular belt mounted on the wheels for pulling the scanning module. The structures of such prior art driving devices are usually quite complex which are very costly and difficult to install or maintain.

SUMMARY OF THE INVENTION

It is therefore a primary objective of the present invention to provide a flatbed scanner with a self-driven scanning module which can greatly simplify the driving mechanism of the scanner.

In a preferred embodiment, the present invention provides a scanner comprising:

- a housing having a transparent platform on its top for placing a document;
- a track mechanism installed inside the housing along a front-and-rear direction of the housing;
- a scanning module mounted on the track mechanism slidable along the front-and-rear direction for scanning the document; and
- a driving device installed on the scanning module having a roller wheel and a motor for driving the roller wheel to move the scanning module back and forth along the track mechanism.

It is an advantage of the present invention that the flatbed scanner comprises a self-driven scanning module which greatly simplifies the driving mechanism of the scanner.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
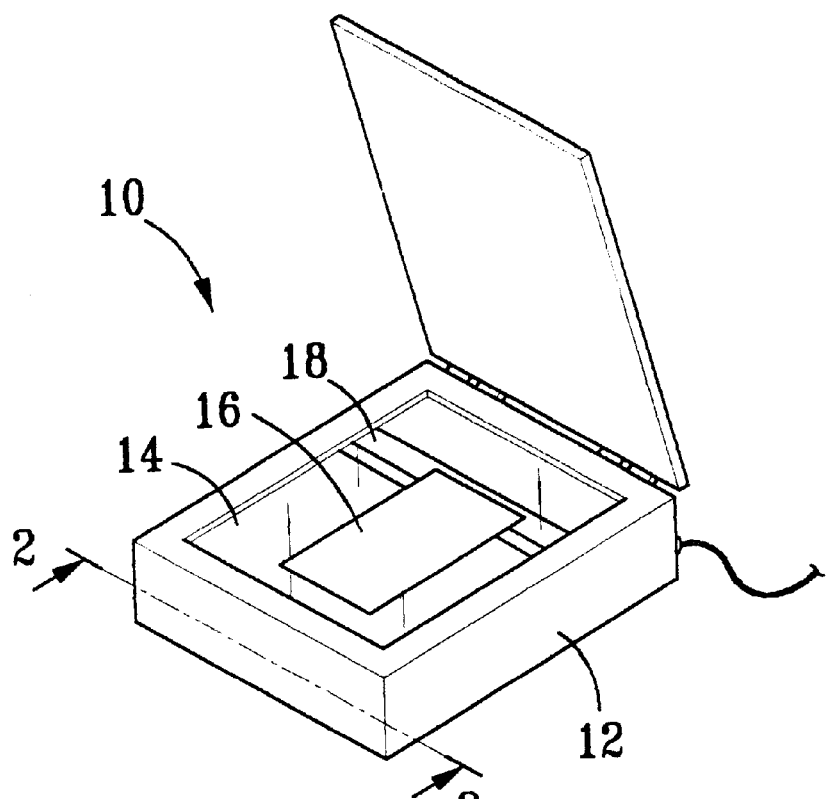
FIG. 1 is a perspective view of a flatbed scanner according to the present invention.
Figure 2:
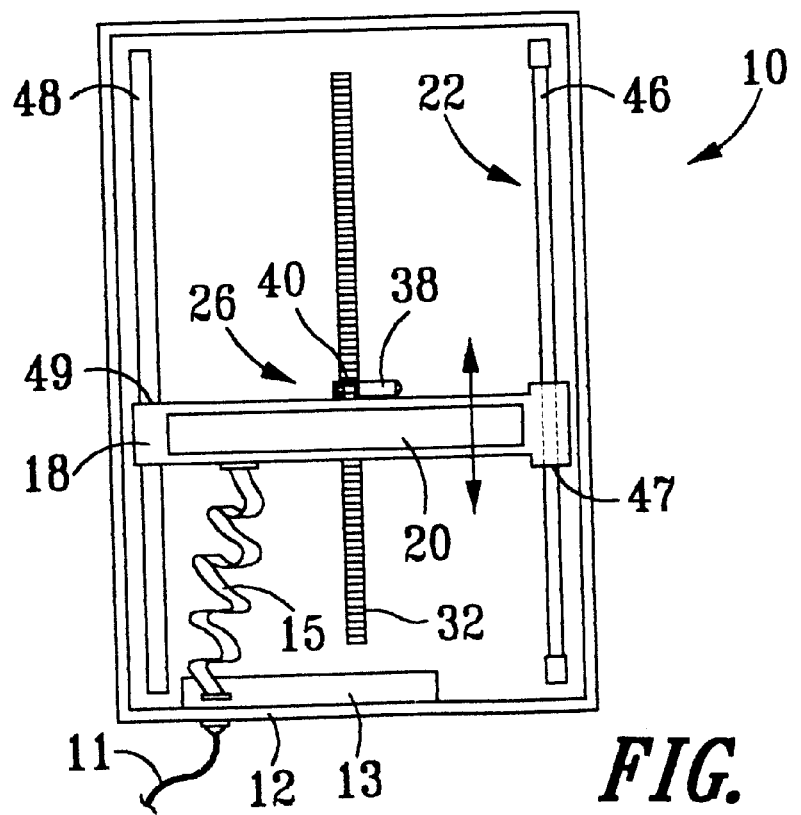
FIG. 2 is a sectional view taken along line 2—2 of the flatbed scanner shown in FIG. 1.

Please refer to FIGS. 1 and 2. FIG. 1 is a perspective view of a flatbed scanner 10 according to the present invention. FIG. 2 is a sectional view taken along line 2—2 of the flatbed scanner 10 shown in FIG. 1. The flatbed scanner 10 comprises a housing 12, a scanning module 18, a track mechanism 22 installed along a front-and-rear direction inside the housing 12, a driving device 26 installed at the front side of the scanning module 18, and a control circuit 13. The housing 12 comprises a transparent platform 14 on its top for placing a document 16, and a serrated surface 32 horizontally installed along the front-and-rear direction on the bottom of the housing 12. The track mechanism 22 comprises two parallel rail mechanisms 46 and 48 installed on left and right sides of the housing. The rail mechanism 46 is a sliding rod, and the rail mechanism 48 is a horizontal supporting arm. The scanning module 18 is slidably installed inside the housing 12 below the transparent platform 14. It comprises an elongated sensor 20 for scanning the document 16 placed on the transparent platform 14. The scanning module 18 further comprises a sliding sleeve 47 on its left end which is slidably mounted on the sliding rod 46, and a smooth surface 49 on its right end which is slidably engaged on the supporting arm 48. The driving device 26 comprises a roller wheel 40 which is a gear wheel and a motor 38 for driving the roller wheel 40 over the serrated surface 32. When driving the scanning module 18, the gear wheel 40 is rotatably interacted with the serrated surface 32 for driving the scanning module 18 back and forth. The control circuit 13 is installed at the rear end of the housing 12 for controlling operations of the scanner 10. It is electrically connected to a computer (not shown) through cable 11, and electrically connected with the scanning module 18 through a cable 15.

Figure 3:
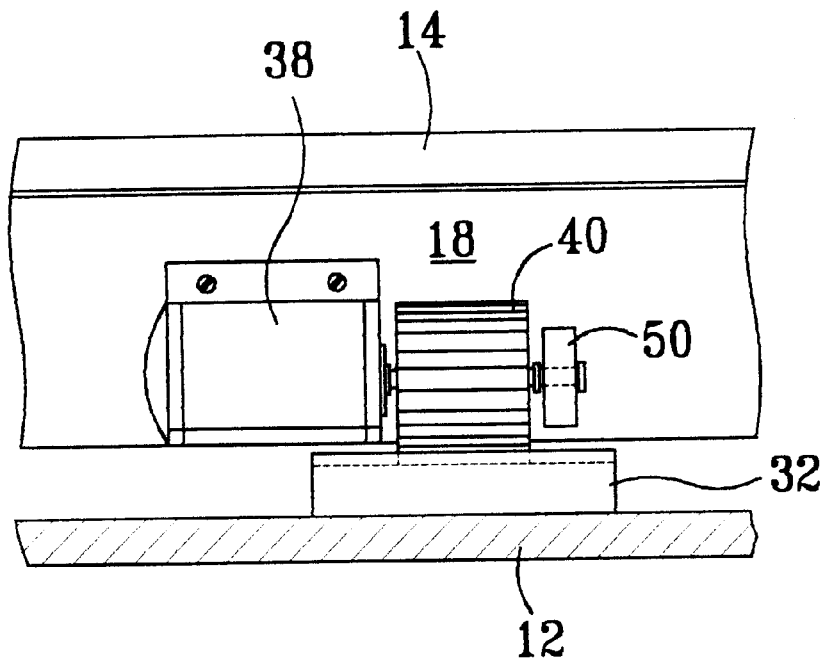
FIG. 3 is a front view of the driving device coupled with the scanning module shown in FIG. 2.
Figure 4:
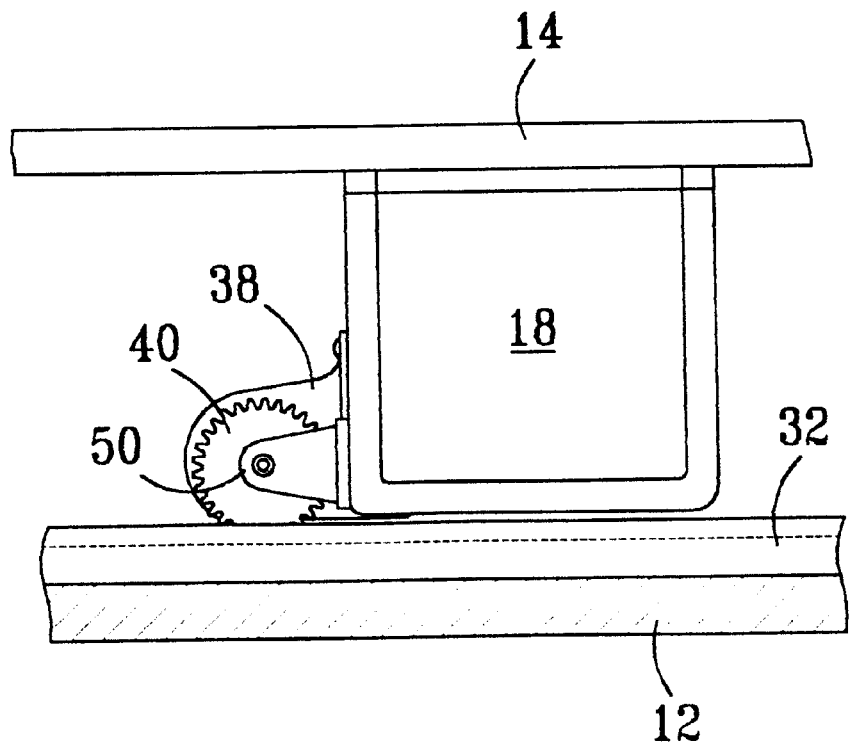
FIG. 4 is a side view of the driving device and the scanning module shown in FIG. 2.

Please refer to FIG. 3 and FIG. 4. FIG. 3 is a front view of the driving device 26 coupled with the scanning module 18. FIG. 4 is a side view of the driving device 26 and the scanning module 18. The driving device 26 is installed on the front side of the middle portion of the scanning module 18. It can also be installed on other sides such as rear side or bottom side of the scanning module 18. The driving device 26 comprises a gear wheel 40, a motor 38 for driving the gear wheel 40 back and forth along the serrated surface 32 installed on the bottom of the housing 12, and a mounting arm 50 for mounting one end of the gear wheel 40.

Figure 5:
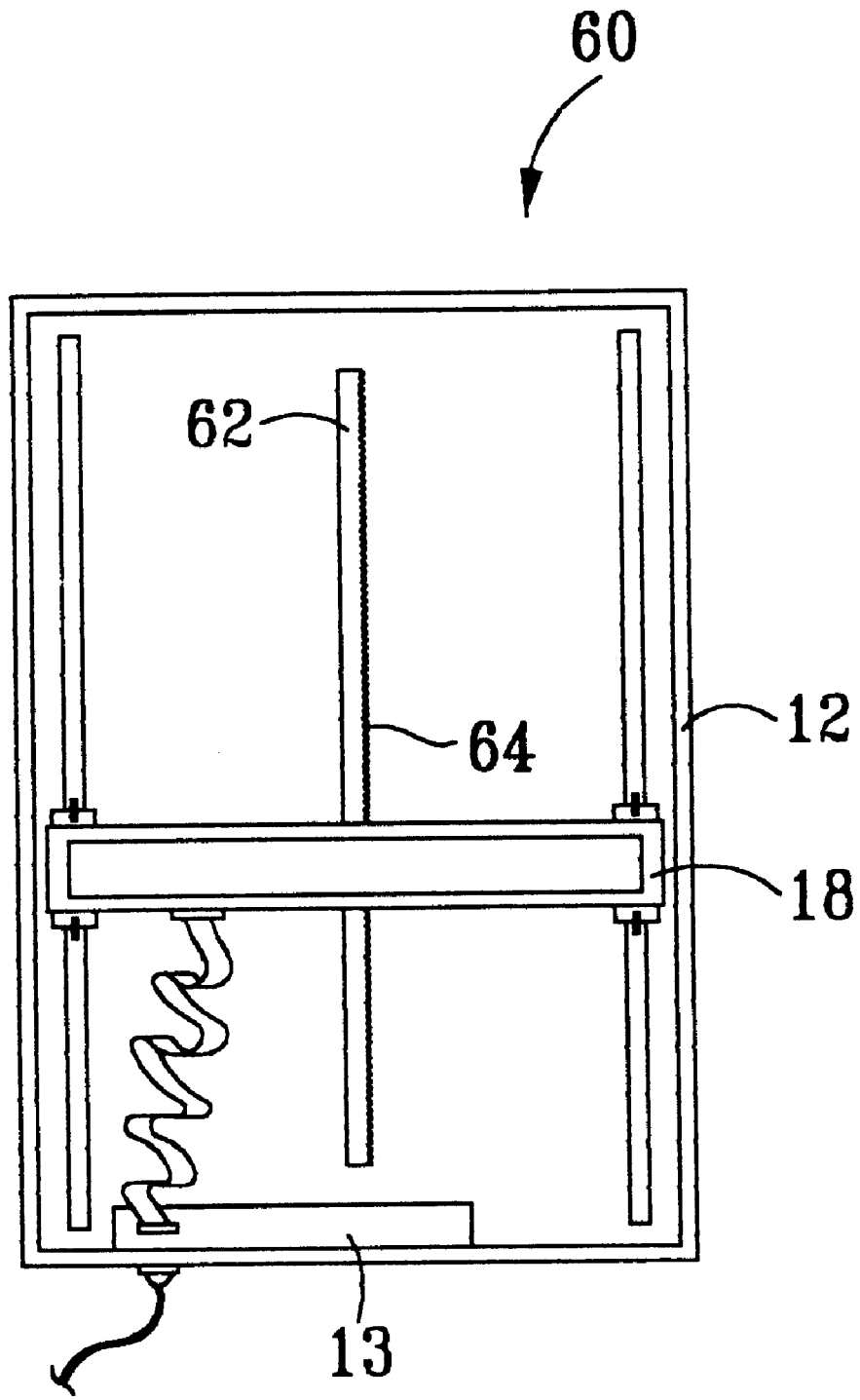
FIG. 5 is a sectional view of an alternative flatbed scanner according to the present invention.
Figure 6:
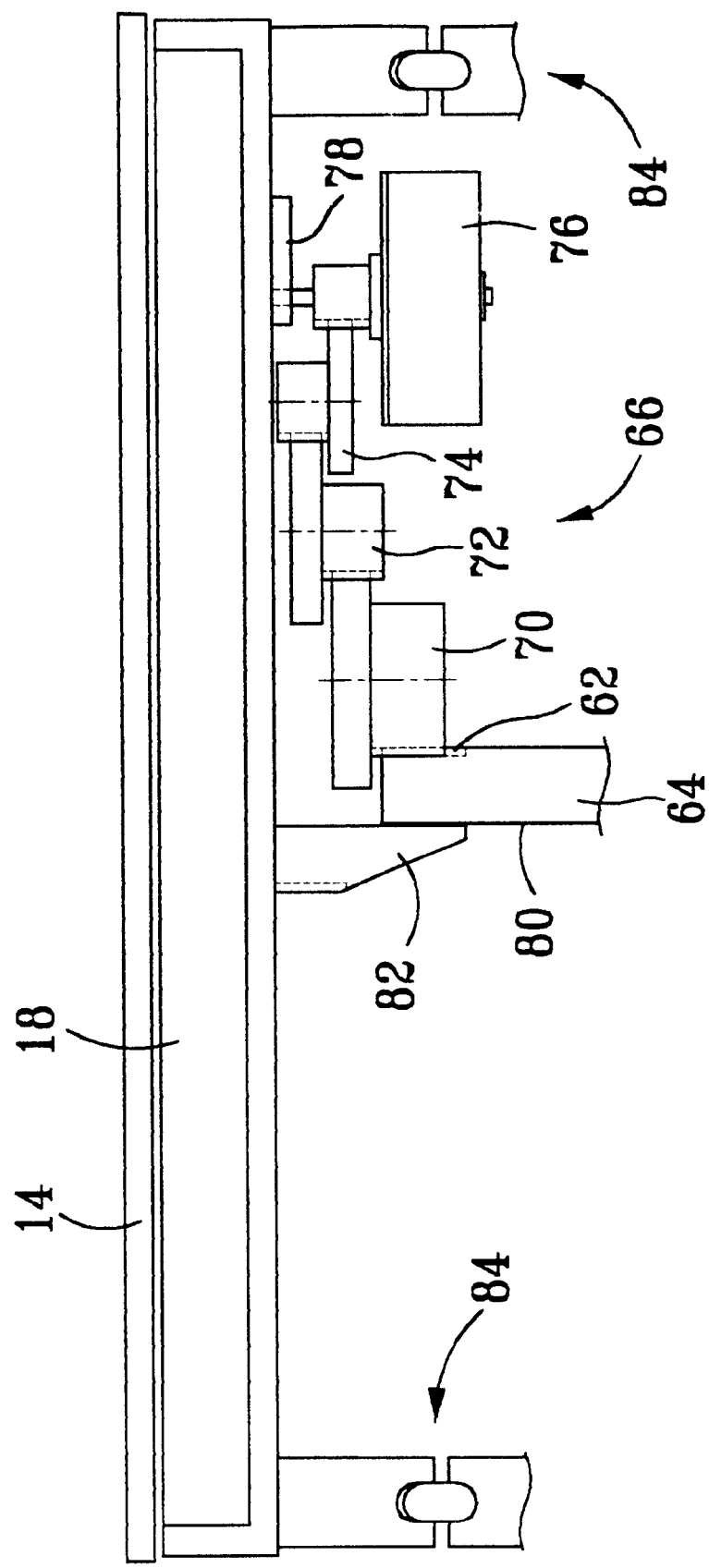
FIG. 6 is a front view of the driving device coupled with the scanning module shown in FIG. 5.
Figure 7:
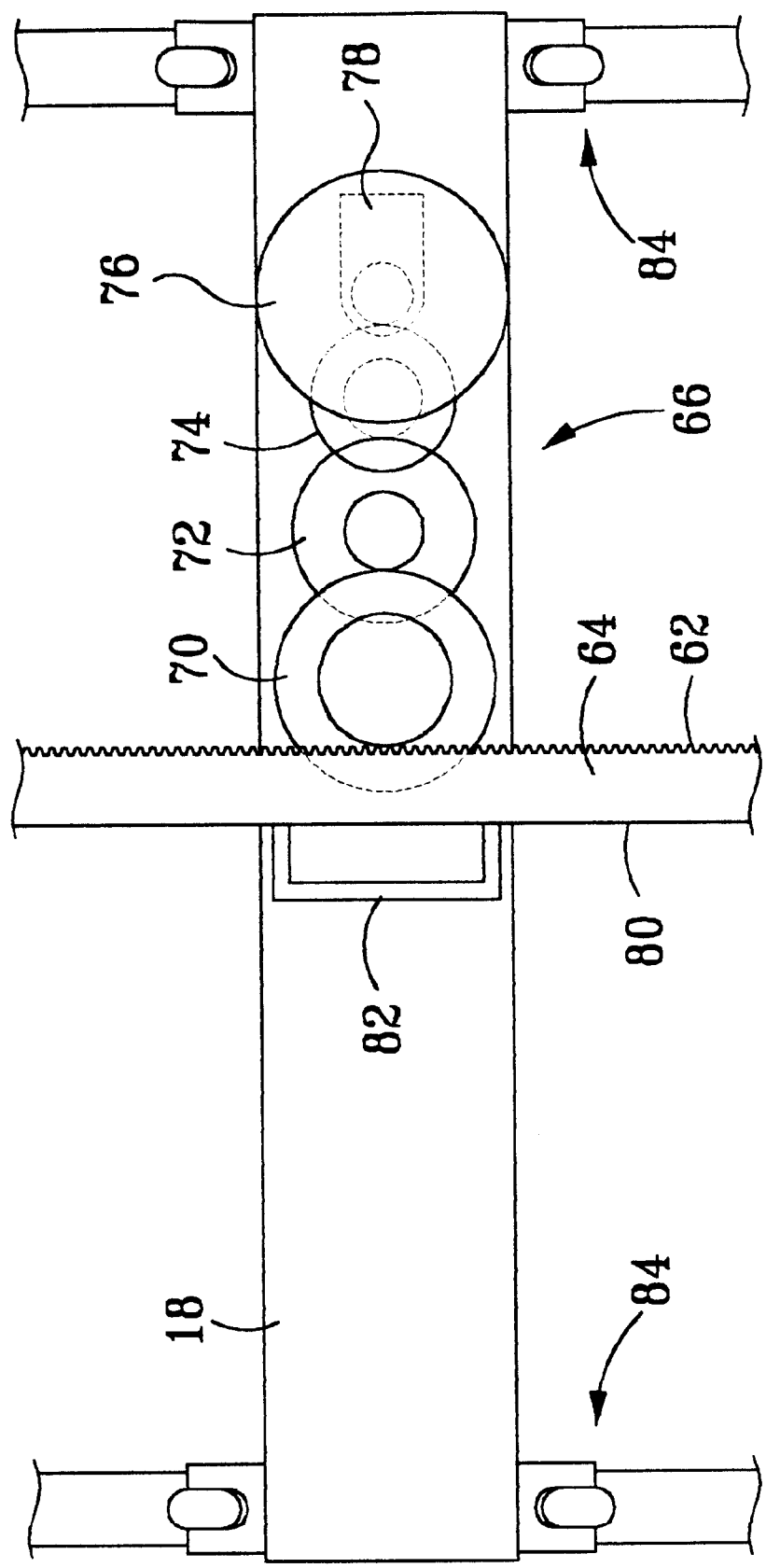
FIG. 7 is a side view of the driving device and the scanning module shown in FIG. 5.

The rotation direction of the gear wheel 40 can also be set horizontally to drive the scanning module 18. Please refer to FIGS. 5 to 7. FIG. 5 is a sectional view of an alternative flatbed scanner 60 according to the present invention. FIG. 6 is a side view of the driving device 66 coupled with the scanning module 18. FIG. 7 is a bottom view of the driving device 66 and the scanning module 18. The scanner 60 comprises a protruding ridge 64 installed on a bottom end of the housing 12, a supporting arm 82 installed on a bottom end of the scanning module 18, and a driving device 66 having a horizontally rotated gear wheel 70 in contact with the protruding ridge 64, a stepping motor 76 installed below the scanning module 18 for driving the two reduction gears 72 and 74 to rotate the gear wheel 70 and drive the scanning module 18 directly, and a mounting arm 78 installed under the scanning module 18 for mounting and stabilizing the stepping motor 76. The protruding ridge 64 comprises a vertical serrated surface 62 on one side facing the gear wheel 70 and a flat surface 80 on the other side facing the supporting arm 82 of the scanning module 18. The flat surface 80 is opposite to the serrated surface 62, and the two sides 62 and 80 of the protruding ridge 64 are clamped between the supporting arm 82 of the scanning module 18 and the gear wheel 70 of the driving device 66 so that when the gear wheel 70 is rolling along the serrated surface 62, the gear wheel 70 will always be kept in close contact with the serrated surface 62. When scanning a document, the motor 76 will drive the horizontal gear wheel 70 to interact with the vertical serrated surface 62 so that the scanning module 18 can move back and forth along the vertical serrated surface 62. During a scan operation according to the present invention, the stepping motor 76 will rotate the gear 70 horizontally, and the two reduction gears 72 and 74 can amplify the stepping motor's output power to drive the scanning module 18 back and forth quickly and accurately with the serrated surface 62 and over the sliding mechanism 84. Besides, a stress between the serrated surface 62 and the gear 70 causes of a drop test, that will transfer to the stepping motor 76 by the two reduction gears 72 and 74. The two reduction gears 72 and 74 versa transfer that stress to the stepping motor 76, there will product a attenuation effect and the stress will be decay by the reduction gears 72 and 74 so as to adjust the resting holding torque of the stepping motor 76 great than the decayed stress that will make neither the scanning module 18 nor the driving device 66 having some damage with any kind of portage.

Figure 8:
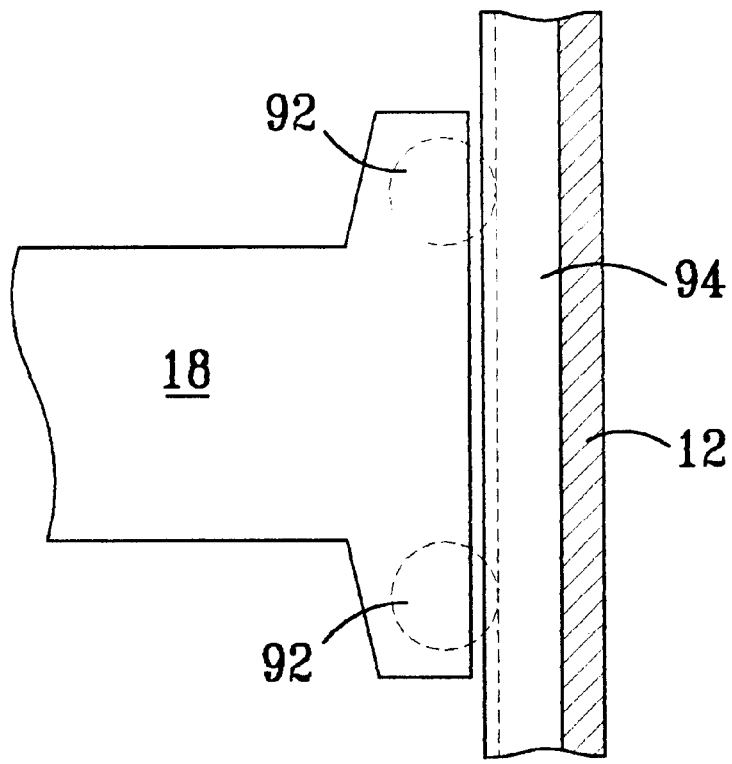
FIG. 8 is a top view of a sliding mechanism with two roller balls according to the present invention.
Figure 9:
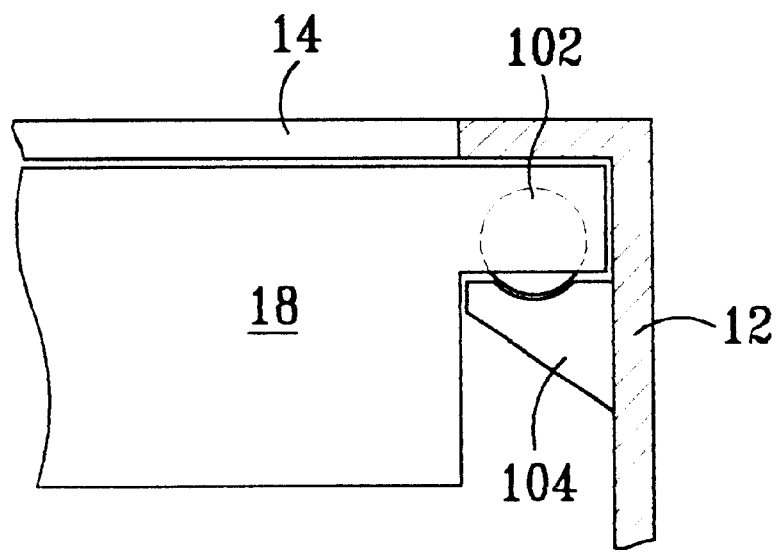
FIG. 9 is a sectional view of an alternative sliding mechanism with two roller balls according to the present invention.

In the track mechanism 22 shown in FIG. 2, the sliding rod 46 and the sliding sleeve 47 installed at the left end of the scanning module 18, or the supporting arm 48 and the smooth surface 49 installed under the right end of the scanning module 18, can be replaced by other sliding mechanisms. Please refer to FIGS. 8 and 9 which show two alternative sliding mechanisms. FIG. 8 is a top view of a sliding mechanism with two roller balls 92 installed at one end of the scanning module 18 according to the present invention. The scanning module 18 comprises two roller balls 92 separately installed at the front and rear sides of one end. The housing 12 comprises a corresponding sliding groove 94 for engaging the two roller balls 92. The roller balls 92 of the scanning module 18 are slidably mounted inside the sliding groove 94 so that the scanning module 18 can slide back and forth inside the housing 12. FIG. 9 is a sectional view of an alternative sliding mechanism with two roller balls 102 installed at one end of the scanning module 18 according to the present invention. The scanning module 18 comprises two roller balls 102 separately installed at the front and rear sides under one end of the scanning module 18. The housing 12 comprises a sliding groove 104 facing upward for engaging the two roller balls 102. The roller balls 102 of the scanning module 18 are slidably mounted inside the sliding groove 104 so that the scanning module 18 can slide back and forth inside the housing 12. The roller balls 102 shown in FIG. 9 can be replaced by two roller wheels to slidably support one end of the scanning module 18 upward.

The track mechanism 22 in FIG. 2 is installed on the left and right sides inside the housing 12, and the serrated surface 32 is installed in the middle portion of the housing 12. The track mechanism 22 can also be installed in the middle portion of the bottom of the housing 12. FIGS. 10 to 13 disclose two alternative embodiments.

Figure 10:
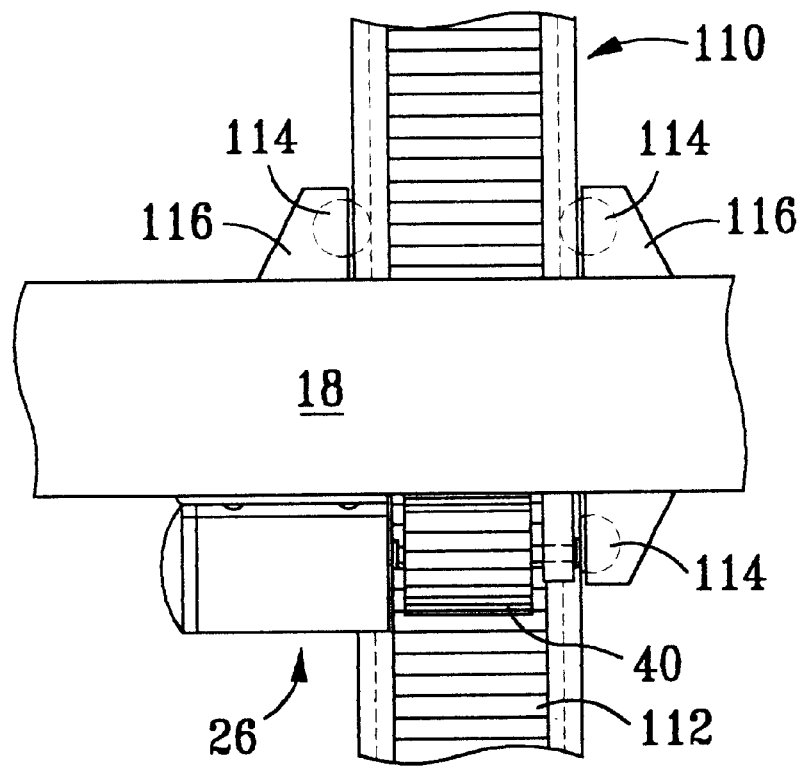
FIG. 10 is a top view of a track mechanism installed in the middle portion of the housing according to the present invention.
Figure 11:
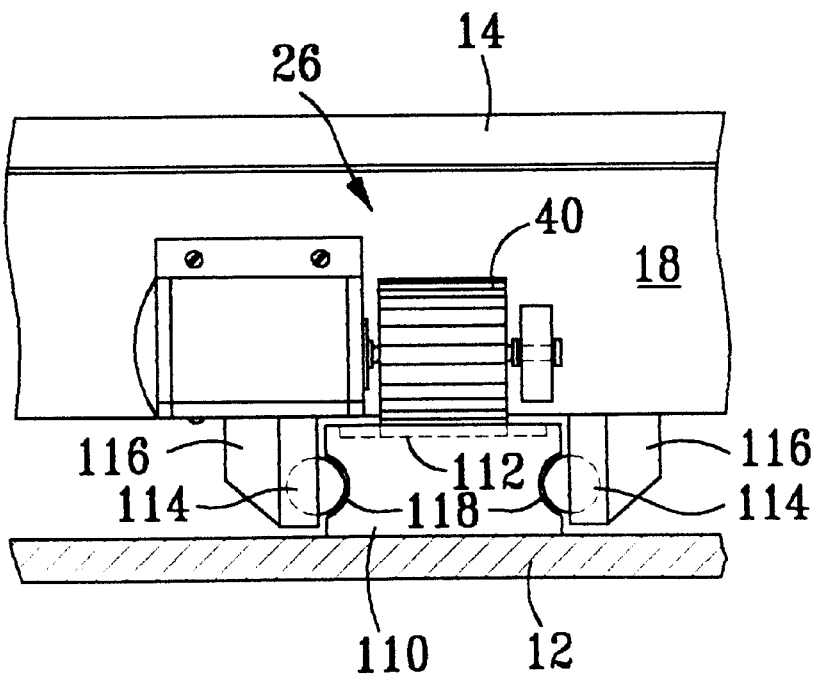
FIG. 11 is a front view of the track mechanism coupled with the scanning module shown in FIG. 10.

Please refer to FIG. 10 and FIG. 11. FIG. 10 is a top view of a track mechanism 110 installed in the middle portion of the housing 12 according to the present invention. FIG. 11 is a front view of the track mechanism 110 coupled with the scanning module 18. The track mechanism 110 is installed under the middle portion of the scanning module 18. It comprises two sliding grooves 118 installed on its left and right sides. And the scanning module 18 comprises two corresponding mounting arms 116 under its middle portion for slidingly engaging the two sliding grooves 118. Each mounting arm 116 comprises two roller balls 114 installed at its front and rear ends which are slidably mounted inside one corresponding sliding groove 118 of the track mechanism 110. The track mechanism 110 further comprises a serrated surface 112 on its top side. The roller wheel 40 of the driving device 26 is a gear wheel which is rotatably interacted with the serrated surface 112 of the track mechanism 110 to move the scanning module 18 back and forth along the track mechanism 110.

Figure 12:
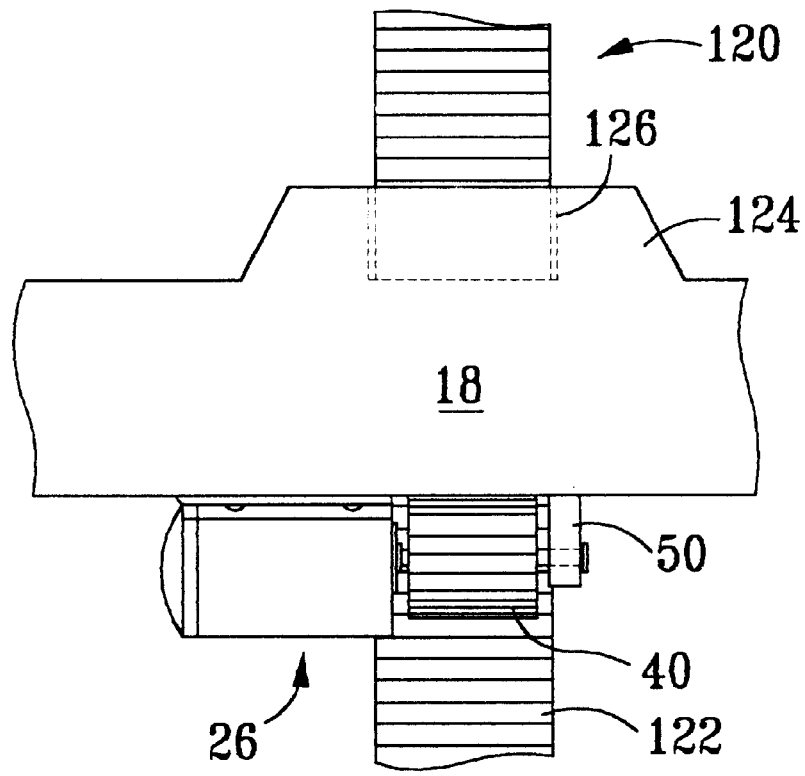
FIG. 12 is a top view of an alternative track mechanism installed in the middle portion of the housing according to the present invention.
Figure 13:
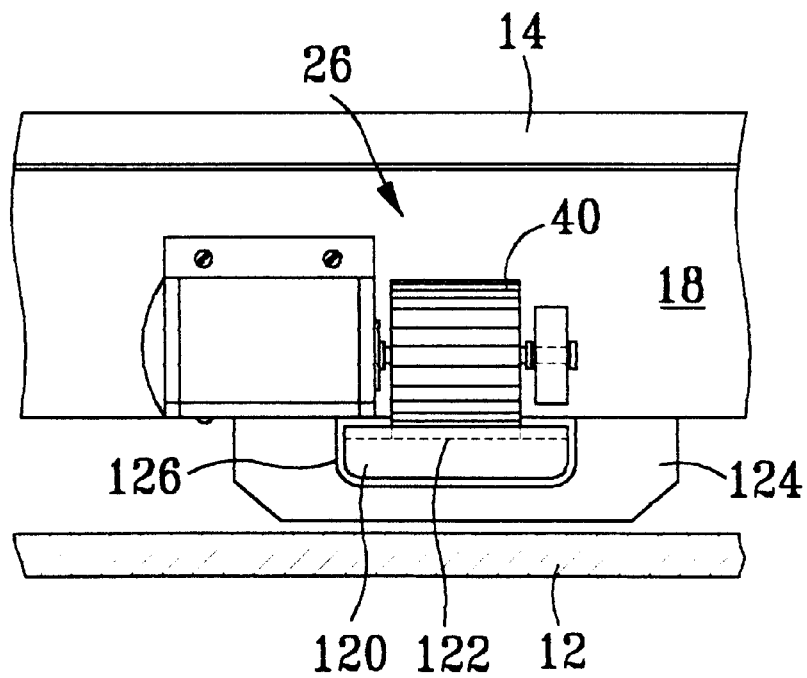
FIG. 13 is a front view of the track mechanism coupled with the scanning module shown in FIG. 12.

Please refer to FIGS. 12 and 13. FIG. 12 is a top view of an alternative track mechanism 120 installed in the middle portion of the housing 12 according to the present invention. FIG. 13 is a front view of the track mechanism 120 coupled with the scanning module 18. The track mechanism 120 is a flattened sliding rod installed in the middle portion of the housing 12 along the front-and-rear direction. The scanning module 18 comprises a supporting arm 124 installed under its middle portion which comprises a sleeve 126 for slidingly engaging the sliding rod 120. The sliding rod 120 further comprises a serrated surface 122 on its upper side for interacting with the gear wheel 40 to drive the scanning module 18.

Comparing with a prior art flatbed scanner, the scanning module 18 of the flatbed scanner 10 comprises a driving device installed on the scanning module 18 to drive the scanning module 18. It does not require any external driving device such as steel strips or a circular belt to pull the scanning module 18 and thus greatly simplifies the driving mechanism of the scanner 10.

Those skilled in the art will readily observe that numerous modifications and alterations of the driving device may be made while retaining the teachings of the invention. Accordingly, the above disclosure should be construed as limited only by the metes and bounds of the appended claims.

What is claimed is:

1. A scanner comprising:
   a housing having a transparent platform on its top for placing a document, and a protruding ridge along a front-and-rear direction of the housing;
   a track mechanism installed inside the housing along the front-and-rear direction of the housing;

a scanning module mounted on the track mechanism slidable along the front-and-rear direction for scanning the document; and a driving device having a roller wheel installed on the scanning module and rotatably interacted with the protruding ridge, and a motor installed on the scanning module for driving the roller wheel to move the scanning module back and forth along the track mechanism to scan the document.

2. The scanner of claim 1 wherein the driving device further comprises a reduction gear engaging with the motor and contacting with the roller wheel for amplifying the motor's output power so that the roller wheel can drive the scanning module.

3. The scanner of claim 1 wherein the roller wheel is a gear wheel and the protruding ridge comprises a serrated surface along the front-and-rear direction for interacting with the gear wheel to drive the scanning module.

4. The scanner of claim 3 wherein a serrated surface is vertically installed on a protruding ridge of the housing, and the gear wheel is horizontally rotated along the serrated surface to drive the scanning module.

5. The scanner of claim 4 wherein the protruding ridge further comprises a flat surface on the opposite side of the serrated surface and the scanning module further comprises a supporting arm for slidingly engaging the flat surface so that the gear wheel is forced by the supporting arm to keep in close contact with the serrated surface when rolling along the serrated surface.

6. The scanner of claim 3 wherein the serrated surface is horizontally installed on a bottom of the housing, and the gear wheel is rotated on the serrated surface to drive the scanning module.

7. The scanner of claim 1 wherein the track mechanism comprises two parallel rail mechanisms installed on left and right sides of the housing, and the scanning module comprises left and right ends slidably mounted on the two rail mechanisms.

8. The scanner of claim 7 wherein one of the rail mechanisms is a sliding rod, and the scanning module comprises a corresponding sleeve slidably mounted on the sliding rod.

9. The scanner of claim 7 wherein one of the rail mechanisms is a supporting arm, and the scanning module comprises a corresponding smooth surface slidably engaged above the supporting arm.

10. The scanner of claim 7 wherein one of the rail mechanisms is a sliding groove, and one corresponding end of the scanning module is slidably engaged in the sliding groove.

11. The scanner of claim 10 wherein the corresponding end of the scanning module comprises two roller wheels rotatably engaged in the sliding groove.

12. The scanner of claim 10 wherein the corresponding end of the scanning module comprises two roller balls rotatably engaged in the sliding groove.

13. A scanner comprising:

a housing having a transparent platform on its top for placing a document;

a track mechanism installed inside the housing along a front-and-rear direction of the housing;

a scanning module mounted on the track mechanism slidable along the front-and-rear direction for scanning the document; and a driving device having a roller wheel installed on the scanning module and in contact with the track mechanism and a motor installed on the scanning module for driving the roller wheel to move the scanning module back and forth along the track mechanism to scan the document;

wherein the track mechanism is installed below the middle portion of the scanning module and the track mechanism comprises two sliding grooves installed on its left and right sides, and wherein the scanning module comprises two sliding means for slidingly engaging the two sliding grooves of the track mechanism.

14. The scanner of claim 13 wherein the roller wheel of the driving device is a gear wheel and wherein the track mechanism comprises a serrated surface on its upper side for interacting with the gear wheel to drive the scanning module.

15. The scanner of claim 13 wherein the track mechanism is a sliding rod installed below the middle portion of the scanning module along the front-and-rear direction, and wherein the scanning module comprises a corresponding sleeve on its lower end slidably mounted on the sliding rod.

16. The scanner of claim 15 wherein the roller wheel of the driving device is a gear wheel and wherein the sliding rod comprises a serrated surface on its upper side for interacting with the gear wheel to drive the scanning module.

* * * * *